United States Patent
Thyroff

(10) Patent No.: US 7,127,937 B1
(45) Date of Patent: Oct. 31, 2006

(54) METHOD FOR LEAK DETECTION IN GAS FEEDING SYSTEMS WITH REDUNDANT VALVES

(75) Inventor: Jurgen Thyroff, Harxheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/142,526

(22) Filed: Jun. 1, 2005

(51) Int. Cl.
H01M 8/04 (2006.01)

(52) U.S. Cl. ............... 73/40.5 R; 429/13; 429/34; 73/49.7

(58) Field of Classification Search ........ 73/40, 73/40.5 R, 46, 47, 49.5, 49.7, 49.8, 116, 118.1; 429/12, 13, 22, 25, 34, 35
See application file for complete search history.

(56) References Cited

U.S. PATENT DOCUMENTS

| | | | |
|---|---|---|---|
| 6,475,651 B1 * | 11/2002 | Wilkinson et al. | 429/13 |
| 6,511,765 B1 * | 1/2003 | Ueno et al. | 429/22 |
| 6,638,650 B1 * | 10/2003 | Bailey et al. | 429/13 |
| 6,662,633 B1 * | 12/2003 | Pratt | 73/40.5 R |
| 6,815,104 B1 * | 11/2004 | Uehara et al. | 429/13 |
| 2002/0017463 A1 * | 2/2002 | Merida-Donis | 204/551 |
| 2003/0110837 A1 * | 6/2003 | Pratt | 73/40.5 R |
| 2003/0124399 A1 * | 7/2003 | Amrhein et al. | 429/19 |
| 2004/0161643 A1 * | 8/2004 | Uehara et al. | 429/13 |
| 2004/0219398 A1 * | 11/2004 | Calhoon | 429/13 |
| 2004/0234829 A1 * | 11/2004 | Sederquist et al. | 429/26 |
| 2005/0214604 A1 * | 9/2005 | Goto et al. | 429/22 |
| 2006/0110640 A1 * | 5/2006 | Yoshida et al. | 429/25 |

* cited by examiner

*Primary Examiner*—Eric S. McCall
(74) *Attorney, Agent, or Firm*—Charles H. Ellerbrock

(57) ABSTRACT

A method for detecting leaks in a fuel cell system that includes a hydrogen storage tank, a primary shut-off valve and a secondary shut-off valve in a supply line. At shutdown, the primary shut-off valve is closed and the stack is temporarily left operating. The pressure is measured in the supply line between the valves. When the measured pressure has reached a predetermined shut-down pressure, the secondary shut-off valve is closed. At the next system start-up, the pressure is measured before the shut-off valves are opened, and the measured pressure is compared with the stored pressure. If the current pressure measurement is lower than the stored pressure measurement, it is an indication that the supply line between the shut-off valves or the secondary valve leaks. If the measured pressure is higher than the stored pressure, it is an indication that the primary valve leaks.

19 Claims, 3 Drawing Sheets

METHOD FOR LEAK DETECTION IN GAS FEEDING SYSTEMS WITH REDUNDANT VALVES

BACKGROUND OF THE INVENTION

1. Field of the Invention

This invention relates generally to a method for detecting leaks in a gas feeding system and, more particularly, to a method for detecting leaks in a supply line between a compressed hydrogen tank and a fuel cell stack, where the method includes measuring the pressure in the supply line between redundant shut-off valves at system shut-down and then at system start-up, and where the two pressures are compared to determine if a leak exists.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Many fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

For some vehicle fuel cell system designs, the hydrogen is stored in one or more compressed gas tanks under high pressure on the vehicle to provide the hydrogen necessary for the fuel cell system. The pressure in the compressed tank can be upwards of 700 bar. The compressed tank typically includes an inner plastic liner that provides a gas tight seal for the hydrogen, and an outer composite structural layer that provides the structural integrity of the tank. Because hydrogen is a very light and diffusive gas, the inner liner must be carefully engineered in order to act as a permeation barrier. The hydrogen is removed from the tank through a pipe. At least one pressure regulator is provided that reduces the pressure of the hydrogen within the tank to a pressure suitable for the fuel cell system.

Fuel cell systems of the type discussed above typically have two shut-off valves between the compressed hydrogen tank and the fuel cell stack for safety purposes. A primary shut-off valve is provided in the supply line proximate to the tank or in the tank, and a secondary shut-off valve is positioned downstream from the primary valve. When the fuel cell system is shut down, both the primary and secondary valves are simultaneously closed. Because hydrogen is a small gas, it is sometimes difficult to store the hydrogen without having it leak through valve seals and the like. Further, it is difficult to ensure the seal integrity of the valves over the life of the system. For these and other reasons, it is desirable to have a leak detection system for detecting hydrogen leaks in the fuel cell system, and particularity in the hydrogen supply line.

SUMMARY OF THE INVENTION

In accordance with the teachings of the present invention, a method for detecting leaks in a fuel cell system that includes one or more high pressure hydrogen storage tanks is disclosed. The system also includes a primary shut-off valve and a secondary shut-off valve in a supply line between the tank and a fuel cell stack. At shut-down, the primary shut-off valve is closed and the stack is temporary left operating. The pressure is measured in the supply line between the valves. When the measured pressure has reached a predetermined shut-down pressure based on the pressure in the tank, the secondary shut-off valve is closed, the stack is shut off and the final pressure measurement is stored in a controller.

At the next system start-up, the pressure in the supply line between the shut-off valves is measured before the shut-off valves are opened, and the measured pressure is compared with the stored pressure from the previous shut-down. If the current pressure measurement is lower than the stored pressure measurement, it is an indication that the supply line between the shut-off valves or the secondary valve leaks. If the measured pressure is higher than the stored pressure, it is an indication that the primary valve leaks.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for detecting leaks in a hydrogen supply line is merely exemplary in nature, and is in no way intended to limit the invention or its applications or uses. For example, the present invention is described for detecting hydrogen leaks in a fuel cell system. However, as will be appreciated by those skilled in the art, the leak detection method of the invention may have application for other gas feeding systems.

Figure 1:
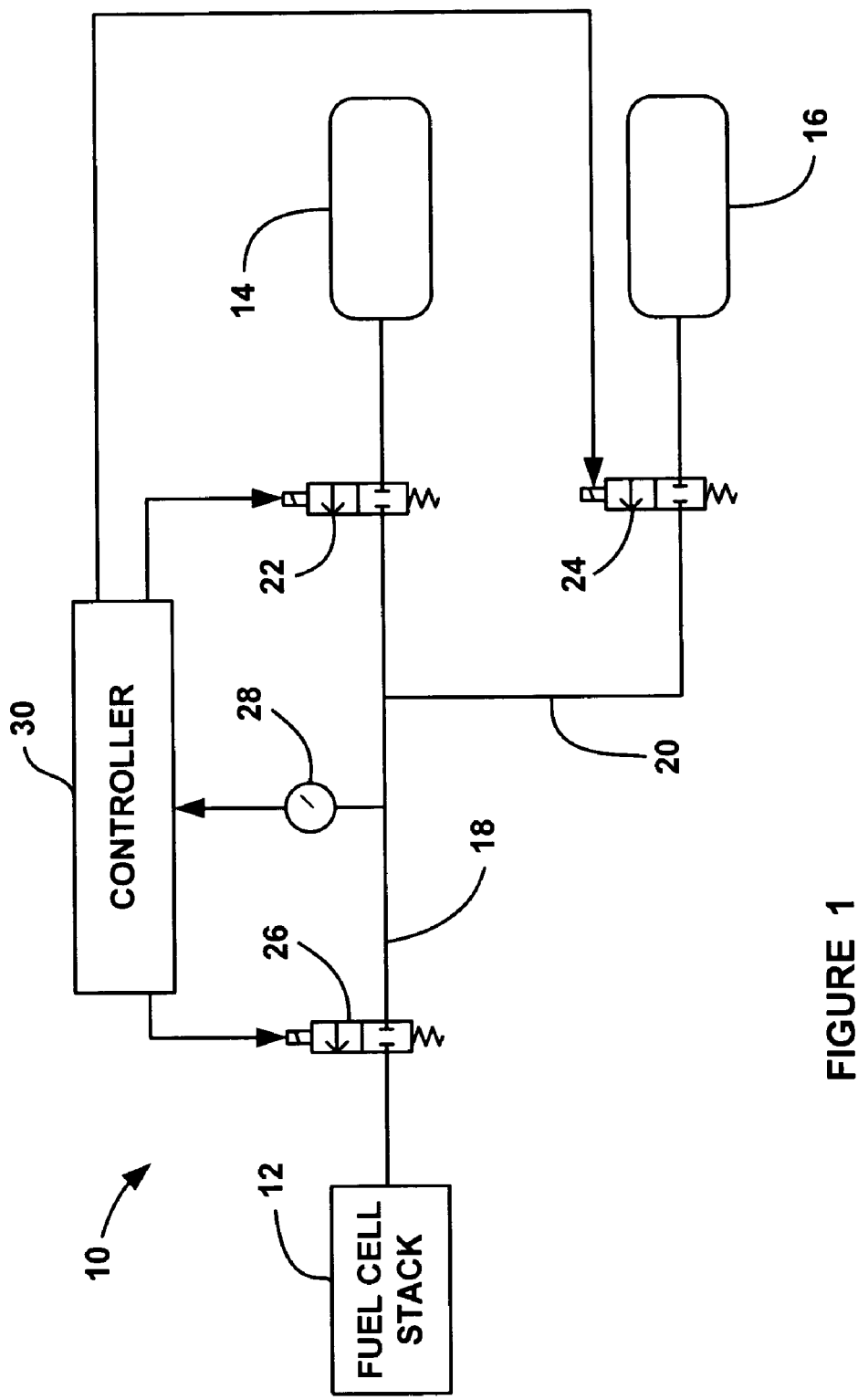
FIG. 1 is a plain view of a fuel cell system employing a method for detecting leaks in a hydrogen supply line, according to an embodiment of the present invention.

FIG. 1 is a plain view of a fuel cell system 10 including a fuel cell stack 12. As will be discussed in detail below, the fuel cell system 10 includes a process for determining whether a leak exists in the system 10, particularly in a hydrogen supply line and/or tank shut-off valves. The fuel cell system 10 includes a first tank 14 and a second tank 16 that store compressed hydrogen, possibly as high as 700 bar. Although two tanks are shown in this embodiment, it will be appreciated by those skilled in the art that some systems may include a single tank and other systems may include more than two tanks. A hydrogen gas supply line 18 is provided between the tank 14 and the fuel cell stack 12, and a hydrogen gas supply line 20 is provided from the tank 16. A primary tank shut-off valve 22 is positioned in the supply line 18 proximate the tank 14 and a primary shut-off valve 24 is positioned in the supply line 20 proximate the tank 16. The valves 22 and 24 may be in the tanks 24 and 26, respectively. A secondary shut-off valve 26 is positioned in the supply line 18 downstream of the primary valves 22 and 24. A pressure sensor 28 measures the pressure in the supply line 18 between the shut-off valves 22 and 26. The measured pressure is provided to a controller 30 that controls the opening and closing of the valves 22, 24 and 26 during system start-up and shut-down.

In the known fuel system shut-down processes, all of the shut-off valves 22, 24 and 26 are closed simultaneously. According to the invention, the process for detecting leaks includes closing the valves 22, 24 and 26 in a certain sequence.

Figure 2:
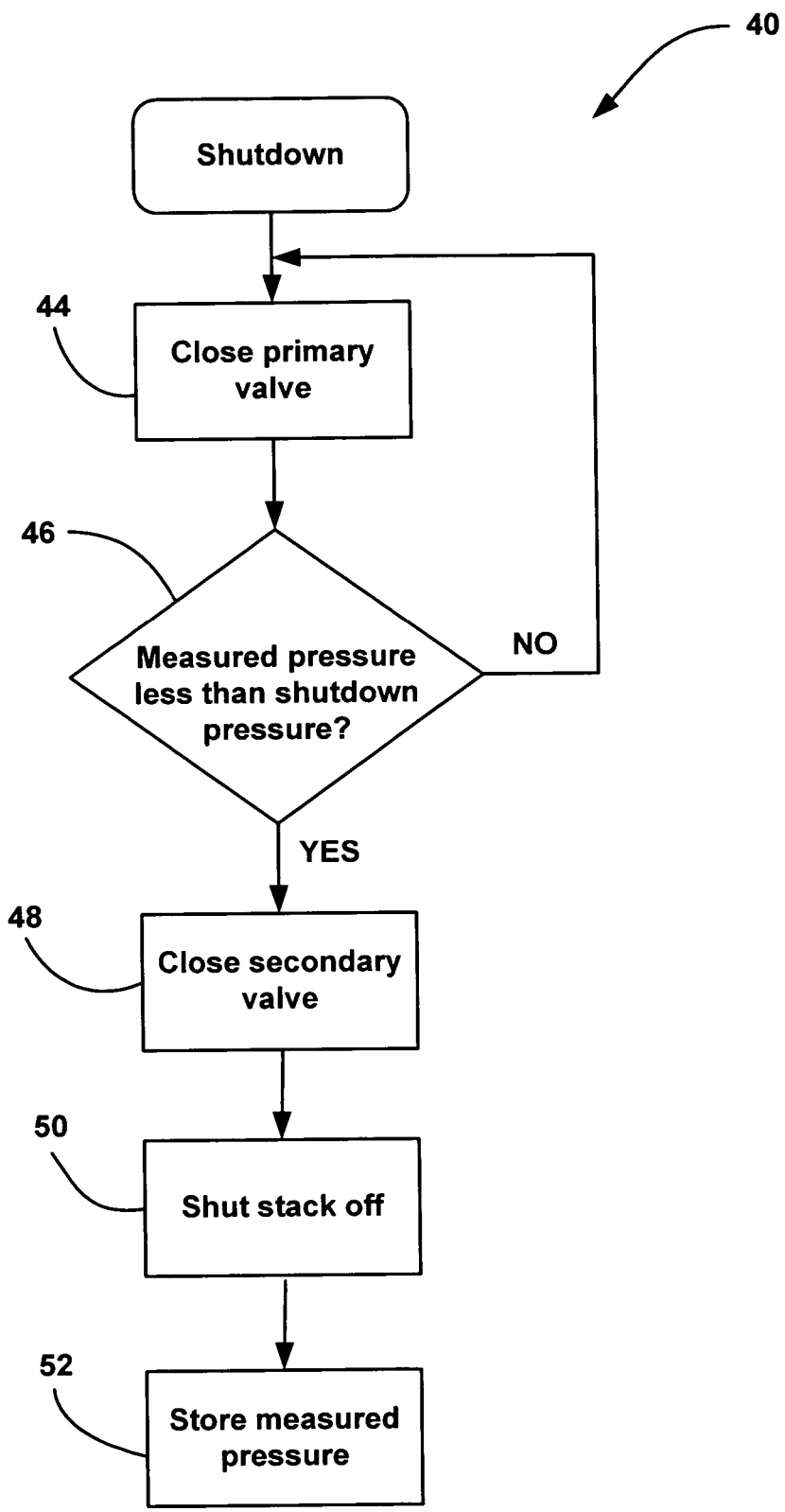
FIG. 2 is a flow chart diagram showing a method for storing a measured pressure in the hydrogen supply line between shut-off valves at system shut-down, according to the invention.

FIG. 2 is a flow chart diagram 40 showing a process for storing a pressure measurement at system shut-down for detecting leaks in the system 10, particularly in the supply line 18, the secondary valve 26 or the primary valves 22 and 24, according to an embodiment of the present invention. At system shut-down, the controller 30 closes the primary valves 22 and 24 at box 44, but leaves the stack 12 temporarily running. The controller 30 then monitors the measured pressure in the supply line 18 by the pressure sensor 28 at decision diamond 46. When the pressure in the supply line 18 between the shut-off valves 22 and 26 drops below a predetermined pressure less than the pressure in the tank 14, the controller 30 closes the secondary valve 26 at box 48 and shuts the stack 12 off at box 50. At this point, the pressure in the supply line 18 between the valves 22 and 26 will be less than the pressure in the tanks 14 and 16, but greater than ambient pressure by some known percentage. For example, if the tanks 14 and 16 are completely full at about 700 bars of pressure, the controller 30 may close the secondary shut-off valve 26 and shut off the stack 12 when the pressure in supply line 18 between the shut-off valves 22 and 26 reaches about 350 bar. Therefore, the algorithm used in the controller 30 allows the stack 12 to consume hydrogen from the supply line 18 after the primary shut-off valve 22 and 24 have been closed until the pressure in the supply line 18 is about half of what the tank pressure is when the primary shut-off valves 22 and 24 are closed. The controller 30 stores the final measured pressure at shut-down at this time at box 52.

Figure 3:
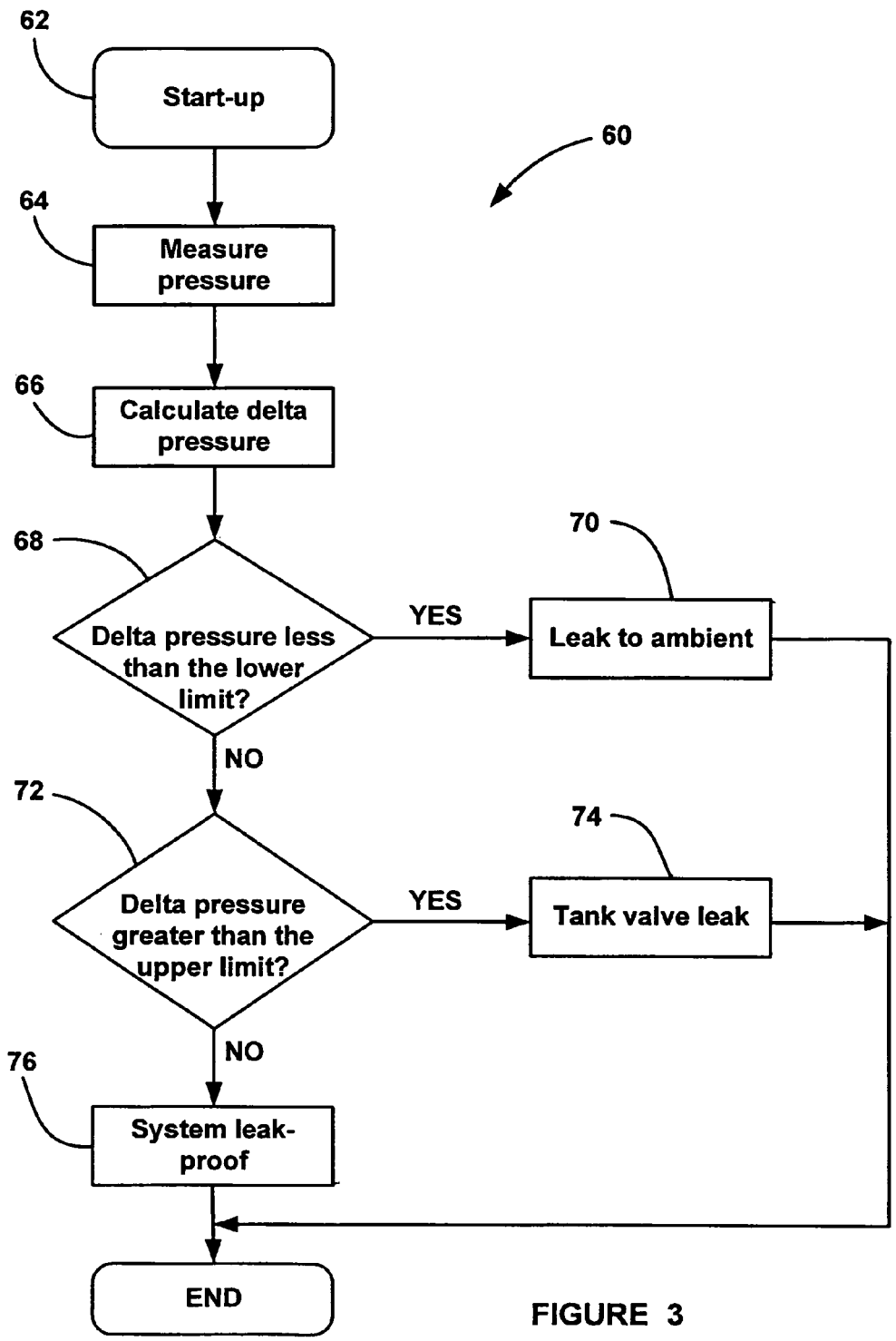
FIG. 3 is a flow chart diagram showing a method for determining if there is a leak in the supply line during system start-up, according to the invention.

FIG. 3 is a flow chart diagram 60 showing a process for determining leaks in the system 10, according to the invention, at the next start-up of the stack 12, represented at box 62. The controller 30 first monitors the pressure in the supply line 18 using the pressure sensor 28 at box 64 before the stack 12 is started. The controller 30 then calculates a delta pressure as the difference between the just measured pressure and the stored pressure from the previous shut-down, as discussed above, at box 66. The controller 30 then determines whether the calculated delta pressure is less than a predetermined low threshold value at decision diamond 68. If the delta pressure is less than the predetermined low threshold value, then the controller 30 determines that there is a leak in the line 18 to ambient between the valves 22 and 26 or a leak in the valve 26 at box 70. Particularly, gas has leaked from the supply line 20 between the valves 22 and 26 or from the valve 26 if the amount of hydrogen in the supply line 20 between the valves 22 and 26 is significantly less than at the previous system shut-down.

If the delta pressure is not less than the lower limit at the decision diamond 68, then the controller 30 determines whether the delta pressure is greater than a predetermined high threshold value at decision diamond 72. If the delta pressure is greater than the predetermined high threshold value at the decision diamond 72, then the controller 30 determines that there is a leak in the primary valve 22 or 24 at box 74. Particularly, gas has leaked from the valve 22 or 24 if the amount of hydrogen in the supply line 20 between the valves 22 and 26 is significantly greater than at the previous system shut-down. If the delta pressure is between the low threshold value and the high threshold value, then the controller 30 determines that the valves 22, 24 and 26 and the supply line 18 between the valve 22 and 26 have not leaked at box 76.

The algorithm in the controller 30 may use a temperature factor when determining the low and high threshold values. Particularly, because the temperature in the supply line 18 may be different at system shut-down than at system start-up, the pressure within the supply line 18 may be different even though the actual volume of hydrogen in the supply line 18 is about the same. Additionally, the algorithm in the controller 30 may consider the time between shut-down and start-up where an extended period of time may include normal permeation of the hydrogen gas without particularly indicating a leak.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining if there is a leak in a fuel cell system, said method comprising:

providing a primary shut-off valve in a supply line between a compressed gas tank and a fuel cell stack;

providing a secondary shut-off valve in the supply line between the primary shut-off valve and the fuel cell stack;

closing the primary shut-off valve at system shut-down;

measuring the pressure in the supply line between the primary shut-off valve and the secondary shut-off valve after the primary shut-off valve has been closed;

closing the secondary shut-off valve when the pressure in the supply line between the primary shut-off valve and the secondary shut-off valve reaches a predetermined pressure;

storing the measured pressure when the secondary shut-off valve is closed;

measuring the pressure in the supply line between the primary shut-off valve and the secondary shut-off valve after the measured pressure is stored when the secondary shut-off valve is closed;

comparing the stored pressure to the measured pressure;

determining that there is a leak is in the secondary shut-off valve of the supply line between the primary shut-off valve and the secondary shut-off valve if the stored pressure is greater than the measured pressure by a predetermined first value; and determining that there is a leak in the primary shut-off valve if the stored pressure is less than the measuring pressure by a predetermined second value.

2. The method according to claim 1 wherein measuring the pressure in the supply line after storing the measured pressure includes measuring the pressure in the supply line when the fuel cell system is started up.

3. The method according to claim 1 further comprising maintaining the fuel cell system operating between measuring the pressure in the supply line after the primary valve is shut off and closing the secondary shut-off valve.

4. The method according to claim 1 further comprising measuring the temperature around the fuel cell system, and wherein determining that there is a leak in the secondary shut-off valve of the supply line between the primary shut-off valve and the secondary shut-off valve and determining that there is a leak in the primary shut-off valve includes considering the temperature difference between when the pressure in the supply line between the primary shut-off valve and the secondary shut-off valve after the primary shut-off valve has been closed is measured and when the pressure in the supply line between the primary shut-off valve and the secondary shut-off valve after the measured pressure is stored when the secondary shut-off valve is closed is measured.

5. The method according to claim 1 wherein determining that there is a leak in the secondary shut-off valve or the supply line between the primary shut-off valve and the secondary shut-off valve and determining that there is a leak in the primary shut-off valve includes considering the time between when the pressure in the supply line between the primary shut-off valve and the secondary shut-off valve after the primary shut-off valve has been closed is measured and when the pressure in the supply line between the primary shut-off valve and the secondary shut-off valve after the measured pressure is stored when the secondary shut-off valve is closed is measured.

6. The method according to claim 1 wherein the fuel cell system includes multiple compressed gas tanks, each including a primary shut-off valve, wherein the method determines if a leak exists in the supply line between the secondary shut-off valve and all of the primary shut-off valves.

7. The method according to claim 1 wherein closing the secondary shut-off valve when the pressure in the supply line between the primary shut-off valve and the secondary shut-off valve reaches a predetermined pressure includes closing the secondary shut-off valve when the pressure in the supply line between the primary shut-off valve and the secondary shut-off valve reaches a pressure that is about half of the current tank pressure.

8. The method according to claim 1 wherein the fuel cell system is on a vehicle.

9. A fuel cell comprising:
a fuel cell stack;
at least one compressed hydrogen gas tank;
a supply line providing gas from the gas tank to the fuel cell stack;
at least one primary shut-off valve in the supply line between the at least one compressed gas tank and the fuel cell stack;
a secondary shut-off valve in the supply line between the at least one primary shut-off valve and the fuel cell stack;
a pressure sensor for measuring the pressure in the supply line between the at least one primary shut-off valve and the secondary shut-of valve; and
a controller responsive to a pressure measurement signal from the pressure sensor, said controller closing the primary shut-off valve at system shut-down, closing the secondary shut-off valve when the pressure in the supply line between the primary shut-off valve and the secondary shut-off valve reaches a predetermined pressure, storing the measured pressure when the secondary shut-off valve is closed, receiving a measured pressure from the pressure sensor between the primary shut-off valve and the secondary shut-off valve after the measured pressure is stored when the secondary shut-off valve is closed, comparing the stored pressure to the measured pressure, determining that there is a leak in the secondary shut-off valve or the supply line between the primary shut-off valve and the secondary shut-off valve if the stored pressure is greater than the measured pressure by a predetermined first value, and determining that there is a leak in the primary shut-off valve if the stored pressure is less than the measured pressure by a determined second value.

10. The fuel cell system according to claim 9 wherein the controller receives the measured pressure from the pressure sensor after storing the measured pressure when the fuel cell system is started up.

11. The fuel cell system according to claim 9 wherein the controller maintains the fuel cell system operating between when the pressure in the supply line after the primary valve is shut off is measured and closing the secondary shut-off valve.

12. The fuel cell system according to claim 9 wherein the controller considers the temperature around the fuel cell system when the controller determines that there is a leak in the secondary shut-off valve or the supply line between the primary shut-off valve and the secondary shut-off valve and determines that there is a leak in the primary shut-off valve.

13. The fuel cell system according to claim 9 wherein the controller considers the time between when the primary shut-off valve is closed and the secondary shut-off valve is closed when the controller determines that there is a leak is in the secondary shut-off valve or the supply line between the primary shut-off valve and the secondary shut-off valve and determines that there is a leak in the primary shut-off valve.

14. The fuel cell system according to claim 9 wherein that at least one compressed gas tank and the at least one primary shut-off is a plurality of compressed gas tanks each including a primary shut-off valve, and wherein the controller determines if there is a leak in the supply line between the secondary shut-off valve and all of the primary shut-off valves.

15. The fuel cell system according to claim 9 wherein the controller closes the secondary shut-off valve when the pressure in the supply line is about half of the tank pressure.

16. The fuel cell system according to claim 9 wherein the fuel cell system is on a vehicle.

17. A fuel cell system comprising:
a fuel cell stack;
a compressed gas tank;
a supply line providing gas from the gas tank to the fuel cell stack;
a primary shut-off valve in the supply line between the compressed gas tank and the fuel cell stack;
a secondary shut-off valve in the supply line between the primary shut-off valve and the fuel cell stack;
a pressure sensor for measuring the pressure in the supply line between the primary shut-off valve and the secondary shut-off valve; and a controller responsive to a pressure measurement signal from the pressure sensor to determine if there is a leak in the secondary shut-off valve, the supply line and the primary shut-off valve.

18. The fuel cell system according to claim 17 wherein the controller determines if there is a leak in the secondary shut-off valve, the supply line and the primary shut-off valve at each start-up of the fuel cell stack.

19. The fuel cell system according to claim 17 wherein the fuel cell system is on a vehicle.

* * * * *